June 2, 1936.  E. E. HALL ET AL  2,042,524
EXPANSION JOINT
Filed May 8, 1933  2 Sheets-Sheet 1

Inventors
Eric E. Hall, and
William H. Eichelman
By Eichelman, attorney

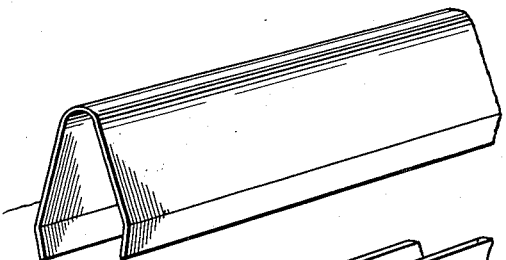
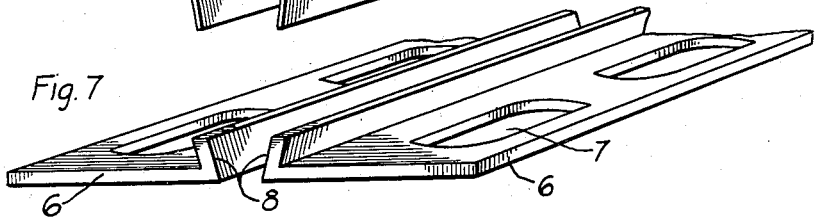
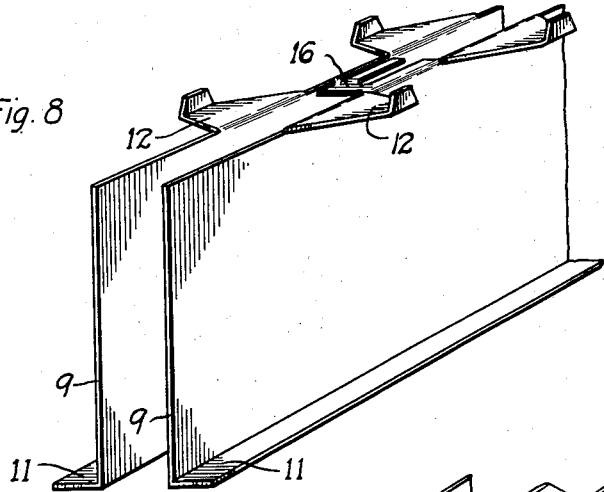
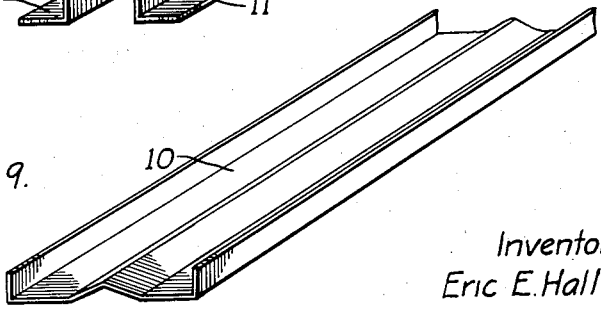

Patented June 2, 1936

2,042,524

UNITED STATES PATENT OFFICE 2,042,524

EXPANSION JOINT

Eric E. Hall, Chicago, and William H. Eichelman, Des Plaines, Ill.; said Hall assignor to said Eichelman Application May 8, 1933, Serial No. 669,814

11 Claims. (Cl. 94—18)

Our present invention relates to improvements in expansion joints for monolithic concrete construction, precast slabs and the like, such as shown and described in our copending applications relating to this subject, filed August 12, 1932, Serial No. 628,576 and filed February 23, 1933, Serial No. 657,978; and likewise, has for its paramount object, the provision of an expansion joint, which when placed between adjacent slabs, will compensate for the expansion and contraction of the slabs and still effectively join and allow of their independent linear movement, sealing and joining of the slabs against the entrance of foreign matter such as water, ice or dirt.

In the applications above referred to we have disclosed what we term a "hair pin" fold, wherein the integral lateral extensions or anchors thereof are cast into the abutting slabs; the fold itself extends up and between the adjacent faces of the slabs, flexing either in or out to accommodate the movement of the slabs.

It is now our object to provide a joint such as previously described, but wherein the fold itself is a separate independent unit serving as a flexible cap or seal for independent anchors cast integral with the slabs, so that the cap may be removed or replaced should it ultimately become impaired or destroyed.

A further object is to inject rigidity into the joint, thus eliminating to a degree the flexibility previously obtained, which function makes this specific joint much more applicable particularly to individual fields of work wherein the former was not adaptable.

A still further object of our invention is to provide a replaceable cap or seal in combination with quasi-rigid anchors, with a suitable stool or support which in itself is braced against collapse; and further to provide means for transmitting the load from one slab to the next adjacent slab and to limit their relative lateral movement at the joint; to effect an air space between the abutting ends of the slabs to permit of their uninterrupted linear movement; and to seal the intervening space tight against the entrance of foreign matter.

Having the foregoing objects in mind, and others as will be more specifically pointed out in the following specification and appended claims, we have illustrated a preferred embodiment of our invention in the accompanying drawings, in which:—

Fig. 6 is an isometric view of the seal;

Fig. 7 is an isometric view of the anchors;

Fig. 8 is an isometric view of the stool; and

Fig. 9 is an isometric view of the base of the stool.

Similar reference characters refer to similar parts thruout the respective views.

An expansion joint when placed between the adjoining ends of sections of concrete, monolithic or precast, must effectively compensate for their lateral or linear movement. The joint to be successful must also provide for a limited relatively vertical movement of the slabs. That is, an appreciable settling of one beyond that of the other should not destroy the joint or impair the seal against the entrance of foreign matter. Where a known load is to be carried from one slab to the next adjacent, as is the case in road building, provision must be made for load transmission. Therefore, for purposes of description only, we elect to define our invention as applied to road building, because, as such, it will involve a great number of principles, action, or functions met with in construction work.

Figure 3:
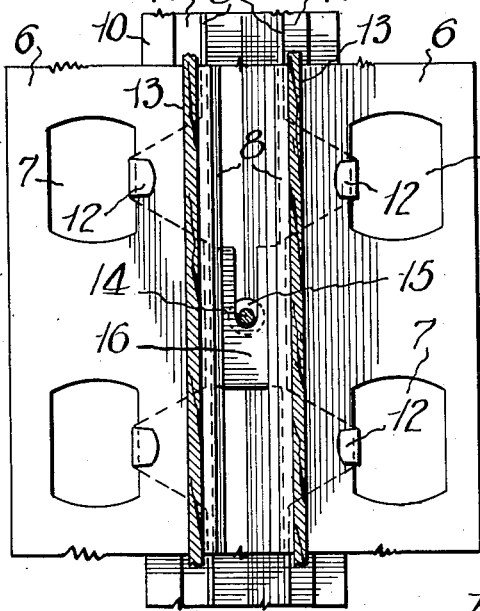
Fig. 3 is a fragmentary horizontal section thru the joint taken on line 3—3 of Fig. 1.

The joint itself comprises a pair of laterally disposed fins or anchors 6, having perforations or apertures 7, therethru at suitable intervals, and with upstanding shoulders or lugs 8, protruding preferably at an acute angle to the plane of the fin 6. The fins 6, may be made in sections or segments, or as a unit, may extend the full length of the joint transversely of the road. Before pouring the concrete, the fins or anchors 6, are supported and positioned by a metallic stool having spaced side walls 9, a bottom closure or base 10, which in turn is crimped and beaded over laterally protruding feet 11, formed outwardly from the walls 9. The top edge of each wall 9, is cut at intervals and formed or flared out at substantially a right angle to form clips 12, upon which the anchors 6, are temporarily supported; the clips 12, registering with the apertures 7, are bent back thereupon to clamp them in place (Fig. 3).

A screed 13, comprised preferably of pieces of wooden moulding, and running the full length of the joint, is secured to the stool by means of tie bolts 14, which pass therethru at regular intervals, the heads 15, of the bolts bearing against the under side of clips 16, punched from the walls 9 in a like manner to the clips 12 just described except that they are turned inwardly to impinge against the wall of the stool directly opposite the wall from which they are formed. The clips 16, further serve the purpose of spacers for the top of the spaced side walls of the stool, and also the additional function of acting as a collapsible reinforcement at this point during the pouring of the concrete; it is appreciated that the resultant forces set up during expansion of the adjoining slabs will destroy such a temporary reinforcing means.

Figure 1:
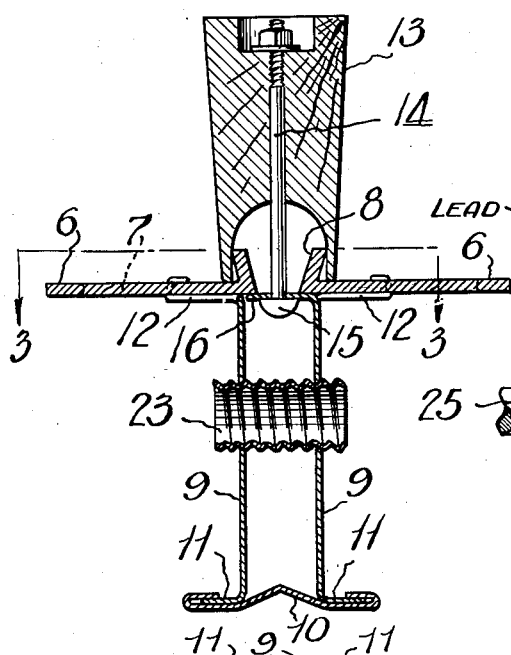
Fig. 1 is a transverse section thru the joint prior to its installation, showing the positioning of the wooden screed before its removal and the placing of the metallic seal.
Figure 2:
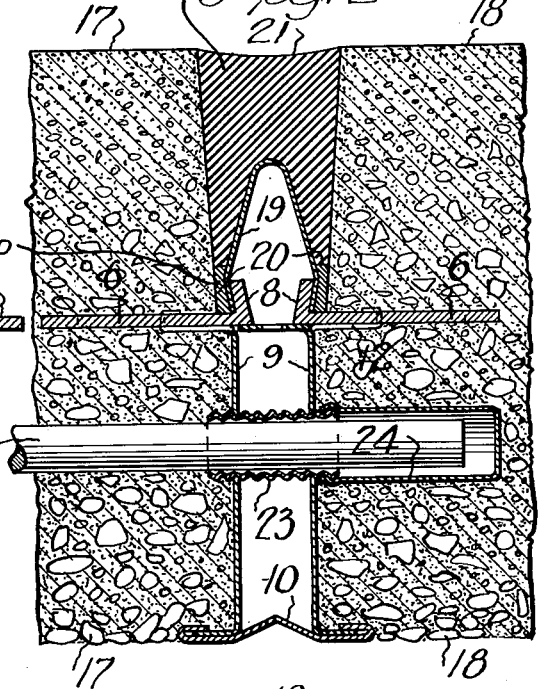
Fig. 2 is a like section of the joint shown cast in place between the ends of adjoining sections of concrete. The screed has been removed and the metallic seal placed.

The joint, as now assembled, is placed ready for the pouring of concrete. Slabs 17, and 18, are cast (Fig. 2) embedding the anchors as shown. After the concrete has taken its set, the screed 13, is removed and replaced with a flexible seal or cap 19, preferably constructed from a non-corrosive metal in the shape of an inverted U or preferably what we term a "hair pin" fold. The seal may have enough elasticity in itself to frictionally grip the protruding shoulders 8, of the anchors as shown. If not, lead 20, is then caulked into each side of the seal and the abutting section of concrete. After this operation a hot tar or bituminous preparation 21, is poured into and fills the opening left by the removal of the screed.

Figure 4:
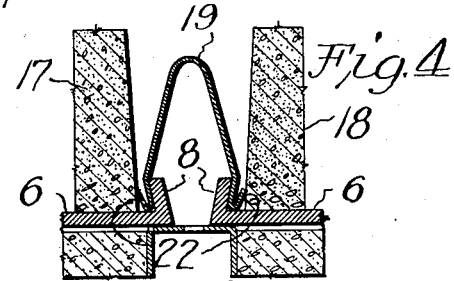
Fig. 4 is a fragmentary sectional detail of the seal, showing one of many possible modifications of the removable seal ready to be caulked.
Figure 5:
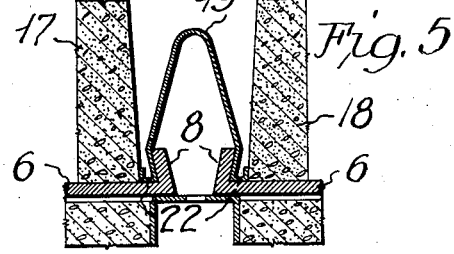
Fig. 5 is a similar view showing the seal after the caulking operation.

Fig. 4 of the drawings shows a modification of the seal 19, wherein the lower edges are bent back and up at 22 before assembly. Fig. 5 shows this same seal with the lower edges 22 caulked down against the anchor and between the shoulder 8, and the adjoining concrete, in which case lead, as a caulking filler is not required.

When load transmission from one slab to the next is desired, a knurled or threaded thimble 23, is positioned connecting the two spaced wall members 9, of the stool intermediate the top and bottom thereof. A dowel bar socket 24, is affixed to one end thereof, and the dowel 25, cast integral with the slab 17, is extended thru the stool and into the socket as shown. The thimble 23, in this case, serves the additional purpose of acting as a spacer or temporary reinforcing member to the stool—assisting the clips 16, in the preventing of the premature collapse or destruction of the stool during the pouring of the concrete.

After the concrete has had its initial set, these reinforcing members have served their purpose—as before stated—and their ultimate collapse and destruction effected by the expansion of the slabs 17, and 18, does in no way effect the proper functioning of the joint as a unit. The same statement holds true to the spaced walls of the stool, as these members likewise have served their purpose once the concrete has set. The clips 12, being of relatively small cross-section, will shear and permit of the free uninterrupted and independent movement of the anchors 6. The stool, as a unit, has no connection to and is not anchored, in any manner, to the ends of the adjoining concrete sections, therefore does not function with the adjoining sections of concrete.

The seal 19, whereas shown as a simple bend of curved cross-section, obviously may be made in any number of designs or shapes, permitting of the relative movement of the concrete sections; and being removably joined to the anchors, may be replaced at small expense should the seal ultimately corrode away or become impaired or damaged due to neglect or accident—without special tools and in no way effecting or altering the anchors, or the adjoining concrete slabs.

Having thus described our invention, what we claim as new and desire to secure by Letters Patent, is:—

1. A selectively removable and replaceable seal for a joint connecting spaced concrete slabs and the like comprising the combination of a pair of anchors supported by the slabs in spaced relation to each other within the space between the slabs, and a flexible seal spanning the space intervening between the anchors and being removably connected thereto, the connection establishing a cooperative relationship between the anchors and the seal thereby to accomplish the flexing of the seal to compensate for the movement of the spaced slabs upon the contraction and expansion thereof.

2. A selectively removable and replaceable seal for an expansion joint connecting spaced concrete slabs and the like comprising the combination of a pair of anchors supported by the slabs in spaced relation to each other within the space between the slabs, a pair of spaced flanges, each flange being a continuation of each anchor and extending beyond the face of its respective slab and extending into the space intervening between the spaced slabs, a flexible seal spanning the space intervening between the flanges, and a coupling medium removably connecting said seal with the flanges, the connection establishing a cooperative relationship between the flanges and the seal to thereby compensate for the movement of the spaced slabs.

3. A selectively removable and replaceable seal for an expansion joint connecting spaced concrete slabs and the like comprising the combination of a pair of anchors fixedly supported by said slabs in spaced relation to each other within the space between the slabs, and a flexible seal spanning the space intervening between the anchors and being removably connected to the anchors to frictionally engage and grip the anchors to coact therewith and thereby control the flexing of the seal to compensate for the movement of the spaced slabs.

4. A selectively removable and replaceable seal for an expansion joint connecting spaced concrete slabs and the like comprising the combination of a pair of anchors positioned in spaced relation within the space intervening between the slabs, said anchors comprising members of relatively rigid construction, and a seal of relatively non-rigid and flexible construction spanning the space intervening between the anchors and being removably coupled to the anchors, the coupling establishing a cooperative relationship between the anchors and the seal thereby to accomplish the flexing of the seal and compensate for the movement of the spaced slabs.

5. A replaceable seal for an expansion joint for connecting spaced concrete slabs and the like comprising the combination of a pair of anchors supported in spaced relation to each other within the space intervening between the spaced slabs, and a flexible seal spanning the space intervening between the spaced anchors and being removably coupled thereto to permit the replacement of the seal, said seal comprising a piece of material bent upon itself to provide spaced walls movable relatively to each other in said space from said bend, and means coupling the lower termination of said walls to the anchors, said means establishing a cooperative relationship between the anchors and the seal thereby to accomplish the flexing of the seal upon the movement of the spaced slabs.

6. A removable seal for an expansion joint for connecting spaced concrete slabs and the like comprising the combination of a pair of anchors maintained in spaced relation to each other within the space between the slabs, a flexible seal spanning the space intervening between the anchors, and a connection between the seal and the spaced anchors providing a coupling for the seal, said coupling establishing a cooperative relationship between the anchors and the seal thereby to accomplish the flexing of the seal to compensate for the movement of the spaced slabs, said coupling comprising each anchor and the adjacent face of its respective slab forming a channel into which a portion of the seal extends and is removably connected.

7. An expansion joint for connecting spaced concrete slabs and the like comprising the combination of a pair of anchors supported by a stool prior to the pouring of the concrete and being capped by a seal subsequent to the pouring of the concrete, each anchor comprising a relatively rigid member adapted to be embedded in its respective slab section, each anchor having a flange extending beyond the face of its respective slab and into the space intervening between the spaced slabs, the seal spanning the space intervening between the flanges and being comprised of a relatively non-rigid and flexible material, said flanges and the adjacent face of each concrete slab forming channels into which portions of the seal extend.

8. An expansion joint for connecting spaced concrete slabs and the like comprising the combination of a pair of anchors supported by a stool prior to the pouring of the concrete and being capped by a seal which is adapted to be applied subsequent to the pouring of the concrete, each anchor comprising a relatively rigid member adapted to be embedded in and anchored to its respective slab section, each anchor having a flange extending beyond the face of its respective slab and into the space intervening between the spaced slabs, the seal spanning the space intervening between the flanges and being comprised of a relatively non-rigid and flexible material, said flanges and the adjacent face of each concrete slab forming channels into which the bottom edges of the seal extend, means for securing said seal thereto and against misplacement, said means consisting of a caulking medium interposed between the face of the slab and the face of the bottom edge of the seal, and a yielding filler interposed between the spaced concrete slabs over and above said seal.

9. An expansion joint for connecting spaced concrete slabs and the like comprising the combination of a pair of anchors supported by a stool prior to the pouring of the concrete and a metallic seal adapted to be applied to said anchors subsequent to the pouring of the concrete, each anchor comprising a member adapted to be secured to its respective slab section, a pair of spaced flanges, one of each of the flanges extending from each anchor beyond the face of the slab and into the space intervening between the spaced slabs, the seal spanning the space intervening between the flanges, said flanges and the adjacent face of each concrete slag forming a channel for the reception of a portion of the seal, and for the reception of additional means whereby the seal is maintained in place and against misplacement.

10. A seal for an expansion joint for connecting spaced concrete slabs comprising the combination of a pair of anchor plates adapted to be mounted in said slabs with an edge of one anchor arranged in spaced relation to an edge of the other anchor in said space between said slabs, and a flexible seal connected with said anchors and bridging the space between said anchors, said connection establishing a cooperative relationship between the anchor plate and the seal thereby to accomplish the flexing of the seal and compensate for the movement of the spaced slabs.

11. A seal for an expansion joint for connecting spaced concrete slabs comprising the combination of a pair of anchor plates adapted to be mounted in said slabs with an edge of one anchor arranged in spaced relation to an edge of the other anchor in said space between said slabs, a flexible seal connected with said anchors and bridging the space between said anchors, said connection establishing a cooperative relationship between the anchors and the seal thereby to accomplish the flexing of the seal and compensate for the movement of the spaced slabs, and a yielding filler interposed between the spaced slabs and the seal, said filler securing the seal to the anchors.

ERIC E. HALL.
WILLIAM H. EICHELMAN.